3,260,759
INCREASED CATALYST LIFE IN THE HYDROGENATION OF HYDROXYALDEHYDES TO POLYOLS

John R. Skinner, Oakland, Calif., assignor to Shell Oil Company, New York, N.Y., a corporation of Delaware
No Drawing. Filed Sept. 27, 1961, Ser. No. 141,023
10 Claims. (Cl. 260—635)

This invention relates to the production of polyols by catalytic hydogenation of water-soluble hydroxyaldehydes. It deals with a new method for carrying out this reaction whereby products of high purity can be produced more cheaply than has heretofore been possible.

There have been many suggestions for carrying out the hydrogenation of hydroxyaldehydes to the corresponding polyols but all these previous methods have suffered from the fact that costs have been high because of the relatively short effective life of the hydrogenation catalysts in these hydrogenations. It has also been difficult to achieve substantially complete conversion of the aldehyde to the desired polyols with the result that the desired product has been contaminated with impurities of approximately the same boiling point which are difficult to remove or with impurities which decompose to other objectionable impurities during the product purification steps. Among the water-soluble hydroxyaldehydes with which this problem has been especially serious are the alpha-hydroxyaldehydes such as alpha-hydroxyadipaldehyde, glyceraldehyde and the like.

A special object of the invention is the provision of an improved method for hydrogenating alpha-hydroxyaldehydes of the above-mentioned kind in a more economical manner whereby the corresponding polyols can be obtained in high purity. A more general object is the provision of a method for hydrogenating water-soluble hydroxyaldehydes in which a long effective life of the hydrogenation catalyst can be achieved. A further object is to provide an efficient method for the rapid and substantially complete conversion of hydroxyaldehydes to the corresponding polyols with minimum formation of by-products during the hydrogenation. Still other objects and advantages of the new method of catalytic hydrogenation of water-soluble hydroxyaldehydes will be apparent from the following description of the invention in some of its more advantageous modifications.

It has been discovered that there are two essential requirements which must be fulfilled if hydroxyaldehydes are to be substantially completely hydrogenated to the corresponding polyols without formation of undesirable by-product or loss in effectiveness of the hydrogenation catalyst. These are control of the free aldehyde concentration in the reaction mixture and promotion of total aldehyde conversion. The first of these requirements is essential in order to avoid the rapid poisoning of the hydrogenation catalyst which has been characteristic of all previous methods of hydroxyaldehyde hydrogenation. This catalyst poisoning has been found to be due, at least in a significant part, to the free aldehyde being hydrogenated. Only by keeping the free aldehyde concentration at an extremely low level is it possible to obtain a long effective catalyst life in the hydrogenation of hydroxyaldehydes. A concentration below about 0.5 equivalent per kilogram of reaction mixture must be maintained at all times during the hydrogenation in order to obtain the improved catalyst life provided by the invention. Preferably the concentration of free aldehyde in the reaction mixture should be maintained below 0.01 equivalent per kilogram of mixture and most advantageously it is maintained essentially zero, that is below the detectable limit for aldehyde as determined by the well known hydroxyamine-hydrogen chloride test described, for example, in Allen's Commercial Organic Analysis, Fifth Edition, volume 1, page 124. Such extremely low concentrations of free aldehyde have not previously been used in the hydrogenation of hydroxyaldehydes, probably because it would be expected that production rates would be so low that the cost would be prohibitive. It has been found, however, that the hydrogenation can be readily carried out at fast reaction rates which insure a high plant production rate without having to resort to reactors of excessive size which would unduly add to the cost of the process.

Because of the low concentration of free aldehyde maintained in the hydrogenator, the catalytic activity of the hydrogenation catalyst is maintained at a high steady state. This apparently is because only a very small portion of catalyst, at most, is being poisoned at any time and the rate of regeneration of the poisoned catalyst under the hydrogenation conditions is equal to the poisoning rate. As a result the catalyst has a very long effective life in the new process and its cost is greatly reduced compared with prior methods of operation. Thus by the new method it has been found feasible to produce in excess of 1200 pounds of polyol per pound of hydrogenation catalyst. This product was recovered as colorless, high purity polyol after only distillation to remove water. These advantageous results are in marked contrast to those obtained by previous methods of hydrogenating the same hydroxyaldehyde. Even when the aldehyde was diluted with alcohol, very much less polyol could be obtained per pound of the same nickel catalyst and the product required repeated hydrogenation to make it suitable for purification.

When the hydrogenation is carried out with the indicated low concentration of free aldehyde in the reaction mixture so that poisoning of the hydrogenation catalyst is substantially avoided, one also avoids the formation of numerous undesirable by-products which are produced as a direct result of the lowered activity of the catalyst. Certain of these by-products are difficult to remove completely from the polyol product. The suppression of their formation through maintenance of a high activity of the hydrogenation catalyst by insuring the required very low concentration of free aldehyde results in a very advantageous improvement in the quality of the polyol product. Indeed, by this method of hydrogenation one can obtain directly products of a purity only achievable by expensive further purification of the polyols produced in prior methods of hydroxyaldehyde hydrogenation.

For maximum quality of polyol product, however, it has been found that, besides control of the free adehyde concentration as above indicated, it is necessary also to control the hydrogenation so as to insure a high conversion of both free aldehyde and any aldehyde in combined form. Combined aldehyde in the form of acetals is often present in hydroxyaldehydes in a small but significant amount as a result, for example, of reaction of one or two hydroxyl groups of the aldehyde with the aldehyde carbonyl group. Whatever their source, such combined aldehydes constitute very undesirable components of the hydrogenation product because they are difficult to remove from the desired polyols and are detrimental in many of the uses to which the polyols are applied. These combined forms of hydroxy aldehyde are very slow to hydrogenate compared with the free aldehyde and therefore appear as contaminants of the final product unless special precautions are taken. To this end it is important to control the pH of the reaction mixture during the hydrogenation so as to maintain acidic conditions at which any combined aldehyde is hydrolyzed at the moderately high hydrogenation temperature preferably used and the free hydroxy-aldehyde which is liberated is rapidly hydrogenated to polyol.

The remarkable improvement in the purity of the polyol products obtained by the new process is shown especially clearly by comparative tests of the polyols in the preparation of alkyd resins by reaction with phthalic anhydride. The alkyd resin tests are made by heating approximately equal moles of polyol and phthalic anhydride at about 205° C. for about 10 minutes with constant stirring, then cooling a sample in a 20-ml. test tube and measuring the color of the resin with a Gardner-Hellige comparator. This test is a very sensitive detector of undesirable color-forming impurities in polyols, a resin color of 4 or less being necessary for a satisfactory product. Using the method of the invention, alpha-hydroxyadipaldehyde has been hydrogenated to hexanetriol which gave alkyd resin colors of less than 1 on simple stripping of water from the product by distillation at atmospheric pressure. Polyol of such purity cannot be obtained by prior published methods of hydrogenating hydroxyaldehyde. These give products which show colors of 12 to 14 in the alkyd resin test and even when the starting hydroxyaldehyde is used in the form of its hemiacetal in alcohol solution, alkyd resin colors no better than 7 to 8 are obtained because the free aldehyde concentration is still too high in the previous methods of operation.

Different procedures can be used in carrying out the new method which can be conducted semi-batchwise, intermittently or continuously so that the concentration of free aldehyde does not exceed the indicated low values at any time in the process. It is important on this account that start-up of operations be carried out so the required low concentration is maintained from the very beginning. This can be advantageously achieved by starting with an aldehyde-free reactor charge in which the catalyst is present together with hydrogen under hydrogenation conditions. Water or other aqueous mediums in which the hydroxyaldehyde being hydrogenated is soluble can be used or one can advantageously employ a hydrogenated aqueous mixture from a previous hydrogenation in which the aldehyde concentration has the required low value. The hydroxyaldehyde feed to the system is then fed in and hydrogenated at a rate such that the limit for the aldehyde concentration in the aqueous reaction mixture is not exceeded.

One suitable type of apparatus for carrying out the process is an autoclave type reactor in which the catalyst is suspended in the aqueous reaction mixture by suitable agitation. Hydrogen under pressure and hydroxyaldehyde are fed in while hydrogenated mixture is removed continuously through a filter at rates adjusted so as to insure the required low concentration of aldehyde in the reactor. Alternatively, the mixture can be circulated through a fixed bed of solid hydrogenation catalyst while feeding in the reactants and withdrawing reacted mixture from the circulating stream at the proper rates for the required concentration control. Whether fixed or suspended catalyst is employed, there are advantages in feeding the hydroxyaldehyde into the flowing stream of hydrogenation mixture at a plurality of points placed along the path of flow of the stream so that substantial reduction of the aldehyde to polyol occurs before there is further introduction of aldehyde into the mixture. In this way it is feasible to maintain the required low concentration of free aldehyde without using excessive amounts of diluent in the reaction mixture.

The optimum reaction conditions for use in the new process will vary depending on the particular hydrogenation catalyst chosen for the reaction and on the hydroxyaldehyde being hydrogenated. As previously indicated, it is advantageous to promote a fast reaction rate in order to insure a high plant production rate without having to resort to reactors of excessive size which would unduly add to the cost of the process. Increasing the concentrations of hydrogenation catalyst in the reaction mixture is useful for this purpose. The most suitable amount of catalyst will depend upon its activity and on reactor operating conditions. Sufficient catalyst should be used to insure the required low concentration of free aldehyde in the mixture at practical hydroxyaldehyde feed rates. Feed rates can vary widely. Rates of up to about 500 or more pounds of hydroxyaldehyde per hour per pound of catalyst can be successfully used, but rates of up to about 100 pounds per hour per pound of catalyst are preferable. Since excess catalyst in the reactor is not harmful, one can use very low rates of hydroxyaldehyde feed without disadvantage, feed rates of 0.05 pound of hydroxyaldehyde or less per hour per pound of catalyst being usable.

Increased temperature is also useful in promoting high rates of hydrogenation, and the temperature which will be most desirable will similarly depend on the particular hydrogenation catalyst and hydroxyaldehyde being used. With most catalysts and hydroxyaldehydes, temperatures below about 200° C. will usually be most advantageous. Preferred temperatures are generally in the range of about 50° to about 150° C., especially when using nickel and like catalysts.

The process should be operated with the aqueous hydroxyaldehyde solution in the liquid phase, using sufficient hydrogen pressure and agitation to insure adequate transfer of hydrogen to the liquid phase. A hydrogen pressure in the range of about 200 to about 1000 p.s.i.g. is usually satisfactory. Under these conditions, hydrogenation times of about 0.25 to about 20 hours are usually satisfactory although more advantageously times of about 1 to about 10 hours are employed.

The pH in the acid range which will be most suitable will also vary with the type of catalyst employed for the hydrogenation. Especially when using non-precious metal catalysts which are subject to attack by acid, it is important to maintain the pH at a value sufficiently high so that loss of catalyst in this way is reasonably low. At the same time it is important to limit the pH to values sufficiently low so that any acetals present will be hydrolyzed and undesired side reaction, particularly condensation reaction, which the hydroxyaldehydes undergo at higher pH conditions will be avoided. Thus when hydrogenating with base metal catalysts such as nickel or its alloys for example, it has been found that the best results are obtained by maintaining the pH between about 3.5 and about 6.5, most advantageously between about 4 and about 5. With precious metal hydrogenation catalysts, a lower pH can be used successfully but there is usually no advantage in employing a pH below about 2 under such circumstances.

The following examples illustrate in more detail suitable methods of applying the new process of the invention.

*Example I*

Alpha-hydroxyadipaldehyde was hydrogenated continuously in two reaction stages, each carried out in a 4-inch inside diameter by a 22-inch long, jacketed type 316 stainless steel reactor of 4.4 liter capacity equipped with four vertical ¾-inch baffles spaced 90° apart and having a vertical centerline stirrer with 2-inch projections spaced at 2-inch intervals on the shaft. The temperature in each reactor was controlled by circulating hot oil in the jackets. The alpha-hydroxyadipaldehyde feed to the first reactor was supplied thru a dip tube entering at the top and discharging at the bottom of the reactor. Product from the first stage was withdrawn thru a 5 micron porous stainless steel filter of 0.6 square inch area placed flush with the bottom of the reactor and was fed to the second stage reactor where it entered in the same way. Hydrogen at 600 p.s.i.g. was fed thru porous stainless steel spargers at the bottom of each reactor, going first to stage 1 and then at 500 p.s.i.g. to stage 2. Hydrogenated reaction mixture was continuously withdrawn from the second stage in the same way as the product from stage 1, a steady state volume of 2.8 liters being maintained in each reactor.

The runs were started by charging the empty, hydrogen-flushed reactors with prewashed Raney nickel catalyst and then filling to the operating level with distilled water. The catalyst was treated with hydrogen supplied thru the spargers while the reactor was held at reaction temperature for about one hour before the feed of alpha-hydroxyadipaldehyde at a liquid hourly space velocity of 0.4 was supplied to the first reactor. The pH of the reaction mixture was controlled by adding dilute sodium hydroxide solution to the reactors as required to maintain a value of 5.3 to 5.5 in the first stage and 4.5 to 5.0 in the second.

In a first test an aqueous solution of alpha-hydroxyadipaldehyde containing 4.47 equivalents of aldehyde per kilogram was used as feed with a catalyst concentration of 2% by weight in each reactor. The alpha-hydroxyadipaldehyde solution was fed at the rate of 900 ml. per hour or at a liquid hourly space velocity of 0.36 and the temperature was maintained at 90° C. in the first stage and 165° C. in the second. Under these conditions the equivalents of free and combined aldehyde per kilogram of reaction mixture was 0.094 in the first stage and 0.032 in the second stage at the start. The free aldehyde concentrate was too high and the catalyst was rapidly poisoned. The conversion of aldehyde decreased and the concentration of free and combined aldehyde in the mixture increased to 0.185 and 0.066 equivalents per kilogram in the first and second stages respectively after 12 hours of operation. In another test the catalyst concentration was increased to 3.8% wt. in the first stage and 4.1% wt. in the second and the run was carried out under the same conditions except that the hydrogen pressure was increased to 900 p.s.i.g. and 850 p.s.i.g. in the first and second stages respectively and the temperature in the second stage was 90° C. Under these conditions the combined aldehyde concentrations were 0.054 and 0.027 equivalents per kilogram in the first and second reaction stages respectively, the free aldehyde concentration being below the limit detectable by the hydroxylamine hydrogen chloride test in both reactors and remaining so throughout the run in which the catalyst showed no sign of poisoning and the conversion of aldehyde remained essentially constant.

and operated in the same way. The aldehyde was fed as an aqueous solution of 17% wt. concentration containing 2.68 equivalents of aldehyde per kilogram. The feed rate was at the same liquid hourly space velocity of 0.36 used in Example I. No. 24 Raney nickel chromium catalyst containing about 1.9% chromium was used in a concentration of 6.9% in the reaction mixture. A hydrogen pressure of 750 p.s.i.g. was employed with a temperature of 135° C. and a pH of 4.0 maintained by adding dilute sodium hydroxide as required.

Under these conditions a 99.89% conversion of aldehyde was obtained at a total free and combined aldehyde concentration in the reactor of 0.006 equivalent per kilogram. The product after distilling off water had an aldehyde content of 0.015 equivalent per kilogram. After acetylation gas-liquid chromatographic analysis showed less than 0.1% volatile polyols other than 1,2,6-hexanetriol on a water-free basis. The 1,2,6-hexanetriol gave a color of less than one on the Gardner scale in the alkyd resin test. Yields of 1,2,6-hexanetriol in excess of 1200 pounds per pound of catalyst can be obtained under these conditions.

An equally long effective life of catalyst and high purity of product are obtained when alpha,omega-dihydroxygluteraldehyde is hydrogenated in the same way to 1,2,4,5-tetrahydroxypentane.

*Example III*

Hydrogenation of alpha-hydroxyadipaldehyde was carried out in a single stage reactor operated as in Example II but with Baker's 5% wt. ruthenium on carbon of about 500 mesh size as the catalyst. The runs were carried out with 1.3% wt. of catalyst in the reactor using 550 p.s.i.g. hydrogen pressure and a feed solution containing 4.47 equivalents of aldehyde per kilogram fed at the rate of 900 ml. per hour corresponding to L.H.S.V. of 0.36. The pH was 3.6 in both runs which were conducted at different temperatures at which the free aldehyde concentration in the reaction mixture differed so that different quality 1,2,6-hexanetriol products were obtained.

| Hydrogenation Temperature (° C.) | Concentration of Aldehyde in Reaction Mixture (Free and Combined Equivalents per Kilogram) | 1,2,6-Hexanetriol in Product after Stripping off Water, percent weight | Other Polyols, percent weight | Water, percent weight | Color in Alkyd Resin Test |
|---|---|---|---|---|---|
| 135 | 0.060 | 95.0 | 1.8 | 3.0 | 10 |
| 165 | 0.008 | 96.2 | 0.5 | 3.0 | 2 |

| Run No. | Length of Run, Hours | Conversion of Total Aldehyde (mole, percent) | | | |
|---|---|---|---|---|---|
| | | 1st Stage | | 2d Stage | |
| | | Start of Test | End of Test | Start of Test | End of Test |
| 1 | 12 | 97.90 | 95.86 | 99.06 | 98.52 |
| 2 | 66 | 98.88 | 98.88 | 99.40 | 99.40 |

The effective life of the Raney nickel catalyst under the conditions of the second of these tests is many times longer than that obtainable in the first method of operation with too high free aldehyde concentration in the reaction mixture.

*Example II*

The high quality of product obtainable by operation of the invention at a low pH and temperature high enough to insure substantially complete conversion of the combined as well as free aldehyde in the hydrogenation is shown by the following results obtained in hydrogenating alpha-hydroxyadipaldehyde solution in a 13-hour continuous test in a single reactor of the type used in Example I The yield was 3300 pounds of 1,2,6-hexanetriol per pound of catalyst at the lower free aldehyde concentration. This is an effective life for the ruthenium on carbon catalyst which is many times longer than is obtainable when operating with the higher free aldehyde concentration of the first run.

*Example IV*

Trimethylene glycol was produced by hydrogenating hydracrylaldehyde in aqueous solution made by hydrating acrolein solutions of about 18-19% wt. concentration.

The hydrogenation was carried out in a one-liter horizontal stirred autoclave with washed commercial Raney nickel catalyst. The reactor was initially charged with the catalyst in the amount required to provide 0.4% wt. based on the total reactor charge to be used. Then sufficient one-tenth normal sodium acetate solution to permit effective stirring was run in and the reactor was flushed with hydrogen and heated to 50°-75° C. The hydrogen pressure was maintained at 500-1000 p.s.i.g. while the acrolein hydration solution which had been previously brought to pH 6.95 with sodium hydroxide was pumped slowly into the reactor.

When the feed rate of hydracrylaldehyde solution is adjusted so that the concentration of free aldehyde in the reactor is below about 0.05 equivalent of free aldehyde per kilogram of reaction mixture at all times, long effective life of catalyst is obtained while producing trimethylene glycol of high purity. A feed rate at which the free aldehyde concentration in the reactor is 0.009 equivalent per kilogram throughout a reaction period of 15 hours, including 2 hours at reaction temperature after completion of the addition of the acrolein hydration solution gives especially good results. On completion of the reaction, the autoclave is cooled rapidly by circulating water thru the heating coil and product is drained off thru a fitted metal filter disc and the trimethylene glycol recovered by acidifying to pH 4.2 with phosphoric acid, distilling off water until the kettle temperature reaches 116° C. and then adding sodium hydroxide until a sample diluted with water shows a pH of 6.9 and distilling at 10 mm. mercury pressure. In this way product of 99+% trimethylene glycol content is obtained at a catalyst life of 1000 pounds or more of trimethylene glycol per pound of Raney nickel.

In the same way ethylene glycol is obtained from glycollic aldehyde and 1,2 - dihydroxydecane from alpha-hydroxydecanal.

*Example V*

For the hydrogenation of glyceraldehyde to glycerol using a single stage reactor operated continously as in Example II, a feed of 14% glyceraldehyde in water can be used at feed rate corresponding to a liquid hourly space velocity of about 0.4. With chrome-Raney nickel catalyst containing 1.9% wt. chromium prepared as described in U.S. Patent 2,502,348 a temperature of 80° C. and hydrogen pressure of 900 p.s.i.g. can be employed. Using about 9% wt. of catalyst in the reaction mixture, a low concentration of free aldehyde at which catalyst poisoning is avoided can be maintained and a conversion of glyceraldehyde to glycerol of better than 98% can be obtained. The glycerol is readily recoverable in high purity by distillation.

Following the same procedure 4,5-dihydroxycyclohexanecarboxaldehyde is converted to 4,5-dihydroxy-1-hydroxymethylcyclohexane in high yield and purity with long catalyst life.

*Example VI*

Using a continuous method of operation with the chrome-Raney nickel catalyst of Example V dextrose can be hydrogenated to sorbitol. A feed solution of 30% wt. dextrose in deionized water has been used at a flow rate of 0.42 milliliter per minute per gram of catalyst when employing 7.2 grams of catalyst in 300 ml. of liquid phase which was initially deionized water. With a temperature of 150° C. and 700 p.s.i.g. of hydrogen, the concentration of free aldehyde was below that at which catalyst poisoning was detectable and 98+% conversion of dextrose to sorbital was obtained without any decline in conversion during the run.

Still other hydroxyaldehydes can be hydrogenated to polyols in the same way since the method is broadly applicable to hydroxyaldehydes as a class whether mono- or polyhydroxy and whether containing one or more aldehyde groups per molecule. It is especially advantageous for the production of polyols from the corresponding aliphatic hydroxyaldehydes of two to ten carbon atoms per molecule which contain only carbon, hydrogen and hydroxyl and aldehyde oxygen atoms. However, it can also be used with advantage in the hydrogenation of hydroxyaldehydes which contain substituents which may or may not be simultaneously converted under the operating conditions. Thus, for example, alpha,beta-dihydroxy-beta-phenylpropionaldehyde can be hydrogenated by the new method to produce alpha-phenylglycerol and/or alpha-cyclohexylglycerol depending upon the reaction conditions employed and the monoethyl ether of glyceraldehyde can be converted to glycerol monoethyl ether.

While the use of Raney type metal hydrogenation catalysts has certain advantages in the new process, the invention is not limited thereto since, in addition to the use of precious metal catalysts as illustrated in Example III, one can employ any other solid hydrogenation catalyst in the process. Representative examples of other active metal hydrogenation catalysts which can be used are, for instance, copper, silver, gold, molybdenum, tungsten, vanadium, tin, cobalt, iron, rhodium, palladium, osmium, iridium, and platinum. There are, however, special advantages in using nickel catalysts promoted with metals which are also hydrogenation catalysts. Chromium, cobalt, copper, molybdenum, platinum and the like are especially useful when alloyed in minor amounts with nickel. Metal compounds, such, for example, as the oxides, chromites, and the like, of the foregoing catalytic metals are also useful as hydrogenation catalysts in the new process. The hydrogenation catalysts can be used as such or can be deposited on carriers or supports of various known kinds, pumice, carbon, kieselguhr and the like being suitable.

It will thus be seen that the process of the invention is capable of considerable variation. It is not limited to the examples which have been given by way of illustration nor by any theory proposed in explanation of the improved results which are obtained.

I claim as my invention:

1. In a process for converting a water-soluble aliphatic hydroxyaldehyde having 2 to 10 carbon atoms per molecule which contains only carbon, hydrogen, and hydroxyl and aldehyde oxygen atoms to the corresponding polyol by subjecting said aldehyde to catalytic hydrogenation using a catalyst of the group consisting of ruthenium and nickel at about 50° to below about 200° C. and under a hydrogen pressure of at least 200 p.s.i.g., the method of increasing the effective life of the hydrogenation catalyst of, starting the reaction by feeding the aldehyde into prediluted aqueous reaction medium under hydrogenation conditions so the initial contact of catalyst with aldehyde takes place with the concentration of free aldehyde in the mixture below 0.05 equivalents of aldehyde per kilogram of reaction mixture, and continuing the feed of said aldehyde to the reaction mixture under hydrogenation conditions at a rate of 0.05 to 500 pounds of hydroxyaldehyde per hour per pound of hydrogenation catalyst at which said aldehyde concentration is continued to be maintained below 0.05 equivalent of aldehyde per kilogram of reaction mixture throughout the mixture at all times during the reaction.

2. A process in accordance with claim 1 wherein the catalyst is nickel promoted with a metal of the group consisting of chromium, cobalt, copper, molybdenum and platinum.

3. A process in accordance with claim 1 wherein the concentration of free aldehyde is maintained below the amount detectable by the hydroxylamine-hydrogen chloride test throughout the reaction.

4. A process in accordance with claim 1 wherein the hydroxyaldehyde is fed into an aqueous mixture of said polyol containing a suspension of the hydrogenation catalyst in which the total concentration of free aldehyde and aldehyde in acetal form is below 0.05 equivalent per kilogram of reaction mixture and the concentration of free aldehyde does not exceed 0.01 equivalent per kilogram of said mixture at any time at any point in the reactor during the reaction, and the aldehyde feed rate is not greater than 100 pounds per hour per pound of catalyst.

5. A process in accordance with claim 4 wherein the pH of the aqueous reaction mixture is maintained between 2 and 6.5.

6. A process in accordance with claim 4 wherein an alpha-hydroxydialdehyde of 3 to 10 carbon atoms per molecule is hydrogenated at a pH between about 3.5 and about 6.5.

7. A process in accordance with claim 1 wherein 1,2,6-hexanetriol is produced by hydrogenating alpha-hydroxyadipaldehyde at pH between about 4 and about 5, while maintaining the concentration of free aldehyde in the mixture below the amount detectable by the hydroxylamine-hydrogen chloride test throughout the hydrogenation mixture during the entire course of the reaction.

8. Process of claim 7 wherein a Raney nickel catalyst is used.

9. In a process for producing trimethylene glycol by hydrogenating an aqueous solution of hydracrylaldehyde at below about 200° C. and under a hydrogen pressure of at least about 200 p.s.i.g. using Raney nickel catalyst the improvement of maintaining in the reaction mixture a pH between about 4 and about 6.5 and maintaining the concentration of free aldehyde in the mixture below the amount detectable by the hydroxylamine-hydrogen chloride test throughout the hydrogenation mixture during the entire course of the reaction.

10. In a process for producing glycerol by hydrogenating glyceraldehyde by hydrogenating an aqueous solution of glyceraldehyde at below about 200° C. and under a hydrogen pressure of at least about 200 p.s.i.g. in the presence of Raney nickel catalyst the improvement of maintaining in the reaction mixture a pH between about 4 and about 5 while maintaining the concentration of free aldehyde in the mixture below the amount detectable by the hydroxylamine-hydrogen chloride test throughout the hydrogenation mixture during the entire course of the reaction.

References Cited by the Examiner
FOREIGN PATENTS 348,248   5/1931   Great Britain.

LEON ZITVER, *Primary Examiner.*

C. B. PARKER, *Examiner.*

A. H. SUTTO, M. B. ROBERTO, J. E. EVANS,
*Assistant Examiners.*